(12) United States Patent
Kim et al.

(10) Patent No.: US 11,125,918 B2
(45) Date of Patent: Sep. 21, 2021

(54) RESIN COMPOSITION FOR A POLARIZER PROTECTIVE FILM, A POLARIZER PROTECTIVE FILM, A POLARIZING PLATE INCLUDING THE SAME, AND A PREPARATION METHOD OF A POLARIZING PLATE

(71) Applicant: LG CHEM, LTD., Seoul (KR)

(72) Inventors: Hye Min Kim, Daejeon (KR); Yeong Rae Chang, Daejeon (KR); Heon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/591,085

(22) Filed: Oct. 2, 2019

(65) Prior Publication Data

US 2020/0033510 A1 Jan. 30, 2020

Related U.S. Application Data

(62) Division of application No. 14/780,957, filed as application No. PCT/KR2014/002614 on Mar. 27, 2014, now Pat. No. 10,473,825.

(30) Foreign Application Priority Data

| Mar. 27, 2013 | (KR) | 10-2013-0033002 |
| Mar. 27, 2013 | (KR) | 10-2013-0033004 |
| Mar. 26, 2014 | (KR) | 10-2014-0035588 |
| Mar. 26, 2014 | (KR) | 10-2014-0035589 |

(51) Int. Cl.
| G02B 1/14 | (2015.01) |
| G02B 5/30 | (2006.01) |
| C09D 133/14 | (2006.01) |
| C09D 133/06 | (2006.01) |
| B32B 7/02 | (2019.01) |
| B05D 1/40 | (2006.01) |
| B05D 3/06 | (2006.01) |
| B32B 37/00 | (2006.01) |
| C08J 5/18 | (2006.01) |
| B29B 13/08 | (2006.01) |
| B29K 633/04 | (2006.01) |
| B29L 31/34 | (2006.01) |
| B29L 11/00 | (2006.01) |

(52) U.S. Cl.
CPC .............. *G02B 1/14* (2015.01); *B05D 1/40* (2013.01); *B05D 3/067* (2013.01); *B32B 7/02* (2013.01); *B32B 37/025* (2013.01); *C08J 5/18* (2013.01); *C09D 133/064* (2013.01); *C09D 133/066* (2013.01); *C09D 133/14* (2013.01); *G02B 5/305* (2013.01); *B29B 13/08* (2013.01); *B29K 2633/08* (2013.01); *B29K 2995/0034* (2013.01); *B29L 2011/0066* (2013.01); *B29L 2031/3475* (2013.01)

(58) Field of Classification Search
CPC ....................................... C09D 133/00–133/26
See application file for complete search history.

(56) References Cited

U.S. PATENT DOCUMENTS

| 2003/0002154 A1 | 1/2003 | Trapani et al. |
| 2009/0004478 A1 | 1/2009 | Baetzold et al. |
| 2009/0214871 A1 | 8/2009 | Fukuda et al. |

FOREIGN PATENT DOCUMENTS

| CN | 1766018 A | 5/2006 |
| CN | 101443513 A | 5/2009 |
| CN | 102037035 A | 4/2011 |
| JP | H04-247337 A | 9/1992 |
| JP | 2005-010329 A | 1/2005 |
| JP | 2005-062450 A | 3/2005 |
| JP | 2005-208622 A | 8/2005 |
| JP | 2006-145880 A | 6/2006 |
| JP | 2007-094059 A | 4/2007 |
| JP | 2008-105191 A | 5/2008 |
| JP | 2008-129452 A | 6/2008 |
| JP | 2008-165205 A | 7/2008 |
| JP | 2009-031719 A | 2/2009 |
| JP | 2009-104002 A | 5/2009 |
| JP | 2009-139609 A | 6/2009 |
| JP | 2009-156902 A | 7/2009 |
| JP | 2009-204725 A | 9/2009 |
| JP | 2009-222990 A | 10/2009 |
| JP | 2009-282364 A | 12/2009 |
| JP | 2010-072111 A | 4/2010 |
| JP | 2010-102177 A | 5/2010 |
| JP | 2010-111810 A | 5/2010 |

(Continued)

OTHER PUBLICATIONS

Kim et al. "Synthesis and Cured Film Properties of UV-Curable Caprolactone-Modified Urethane Acrylate Oligomers", Polymer (Korea), vol. 34, No. 6, (2010); pp. 574-578.

(Continued)

*Primary Examiner* — Prashant J Khatri
(74) *Attorney, Agent, or Firm* — Rothwell, Figg, Ernst & Manbeck, P.C.

(57) ABSTRACT

The present invention relates to a resin composition for a polarizer protective film, a polarizer protective film, a polarizing plate including the same, and a preparation method of a polarizing plate, and, more specifically, to a resin composition for a polarizer protective film and a polarizer protective film exhibiting high hardness and excellent properties, a polarizing plate including the same, and a preparation method of a polarizing plate. According to the polarizing plate of the present invention, it can be usefully utilized in various fields because of its excellent hardness, flexibility, and optical properties.

6 Claims, No Drawings

(56) References Cited

FOREIGN PATENT DOCUMENTS

| | | |
|---|---|---|
| JP | 2010-133987 A | 6/2010 |
| JP | 2010-190956 A | 9/2010 |
| JP | 2011-085732 A | 4/2011 |
| JP | 2012-078541 A | 4/2012 |
| JP | 2012-093723 A | 5/2012 |
| JP | 2012-098721 A | 5/2012 |
| JP | 4961369 B2 | 6/2012 |
| JP | 2014-159556 A | 9/2014 |
| JP | 2014-160108 A | 9/2014 |
| JP | 2015-521210 A | 7/2015 |
| KR | 10-0587441 B1 | 9/2006 |
| KR | 10-2007-0056920 A | 6/2007 |
| KR | 10-2008-0080528 A | 9/2008 |
| KR | 10-2008-0114841 A | 12/2008 |
| KR | 10-2009-0101762 A | 9/2009 |
| KR | 10-2009-0101763 A | 9/2009 |
| KR | 10-2010-0003717 A | 1/2010 |
| KR | 10-2011-0014555 A | 2/2011 |
| KR | 10-1182468 B1 | 9/2012 |
| KR | 10-1238942 B1 | 3/2013 |

OTHER PUBLICATIONS

Feng et al. "Synthesis and properties of UV curable polyurethane acrylates based on two different hydroxyethyl acrylates", Journal of Central South University, vol. 19, Issue 4, (2012); pp. 911-917.
International Search Report issued in International Application No. PCT/KR2014/002614 dated Jun. 18, 2014, 2 pages.
Kim et al. "Synthesis and Cured Film Properties of UV-Curable Caprolactone-Modified Urethane Acrylate Oligomers (translated)", Polymer Korea, (2010); pp. 1-19.

RESIN COMPOSITION FOR A POLARIZER PROTECTIVE FILM, A POLARIZER PROTECTIVE FILM, A POLARIZING PLATE INCLUDING THE SAME, AND A PREPARATION METHOD OF A POLARIZING PLATE

CROSS REFERENCE TO RELATED APPLICATIONS

This application is a divisional of U.S. patent application Ser. No. 14/780,957 filed on Sep. 28, 2015, which is a 35 U.S.C. § 371 National Phase Entry Application from PCT/KR2014/002614, filed Mar. 27, 2014, and designating the United States, which claims priority under 35 U.S.C. § 119 to Korean Patent Application No. 10-2013-0033002 filed on Mar. 27, 2013, Korean Patent Application No. 10-2013-0033004 filed on Mar. 27, 2013, Korean Patent Application No. 10-2014-0035588 filed on Mar. 26, 2014, and Korean Patent Application No. 10-2014-0035589 filed on Mar. 26, 2014, which are incorporated herein by reference in their entireties.

BACKGROUND OF THE INVENTION

(a) Field of the Invention

The present invention relates to a resin composition for a polarizer protective film, a polarizer protective film, a polarizing plate including the same, and a preparation method of a polarizing plate, and, more specifically, relates to a resin composition for a polarizer protective film and a polarizer protective film exhibiting excellent physical and optical properties, a polarizing plate including the same, and a preparation method of a polarizing plate.

(b) Description of the Related Art

A liquid crystal display (LCD) is one of a variety of flat panel displays which are currently widely available. Typically, an LCD is configured such that a liquid crystal layer is interposed between a thin film transistor (TFT) array substrate and a color filter substrate. When an electric field is applied to electrodes of the array substrate and the color filter substrate, liquid crystal molecules of the liquid crystal layer interposed therebetween are differently arranged, thereby displaying an image.

Meanwhile, a polarizing plate is provided outside the array substrate and the color filter substrate. The polarizing plate enables selective transmission of light in a specific direction among light from a backlight unit and light passed through the liquid crystal layer, thus controlling polarization.

The polarizing plate includes a polarizer for polarizing light in a predetermined direction and a protective film attached to the polarizer to support and protect the polarizer.

As the protective film, a film of triacetylcellulose (TAC) is widely used. Furthermore, in order to achieve a film having high hardness and wear resistance, a protective film coated with a hard coating layer is proposed.

Meanwhile, recently, LCDs are used to the devices of various fields because the use thereof becomes extensive, and interests in improving the hardness and reducing the thickness of polarizing plate are rising.

Due to such necessity, Japanese Patent Publication No. 2005-010329 discloses the polarizing plate prepared by forming a protecting layer on the surface of a polarizer by using a photopolymerizable compound, without a TAC film. However, it is still required to develop polarizing plates having not only a sufficient hardness but also thinner thickness enough to make devices thinner and showing a sufficient flexibility for mass production process.

SUMMARY OF THE INVENTION

To resolve above problems, the present invention provides a resin composition for a polarizer protective film and a polarizer protective film which can be thinner with high hardness and transparency and shows excellent flexibility to generate neither curling nor cracking, a polarizing plate including the same, and a preparation method of a polarizing plate.

To resolve above problems, the present invention provides a resin composition, including a binder including a multifunctional acrylate monomer and an acrylate oligomer having the elongation of 5 to 200%; and a photoinitiator.

The present invention also provides a polarizer protective film, including a cured resin formed from a multifunctional acrylate monomer and an acrylate oligomer having the elongation of 5 to 200%.

The present invention also provides a polarizing plate, including a polarizer; and a protective film formed on at least one face of the polarizer, wherein the protective film includes a cured resin formed from a multifunctional acrylate monomer and an acrylate oligomer having the elongation of 5 to 200%.

The present invention also provides a preparation method of a polarizing plate, including the steps of:

coating a resin composition including a binder including a multifunctional acrylate monomer and an acrylate oligomer having the elongation of 5 to 200%, and a photoinitiator on a release film;

forming a protective film by photocuring the coated resin composition; and laminating the protective film on one face of a polarizer to attach the same.

According to the present invention, the protective film can be usefully applied to a variety of displays because it shows high hardness, scratch resistance, and transparency and generates neither curling nor cracking due to its high processability. Furthermore, it can be made thinner because it can be used without a separate coating on a substrate film like a TAC film. Particularly, since it does not include a stretched film, it shows low retardation value as near as 0 substantially and thus it can be used not only to polarizer protective films but also to various devices requiring such low retardation value without limit.

Furthermore, it has an advantage of being applicable to large-scaled or curved displays because of its excellent processability and flexibility.

DETAILED DESCRIPTION OF THE EMBODIMENTS

The resin composition of the present invention includes a binder including a multifunctional acrylate monomer and an acrylate oligomer having the elongation of 5 to 200%; and a photoinitiator.

The polarizer protective film of the present invention includes a cured resin formed from a multifunctional acrylate monomer and an acrylate oligomer having the elongation of 5 to 200%.

The polarizing plate of the present invention includes a polarizer; and a protective film formed on at least one face of the polarizer, wherein the protective film includes a cured resin formed from a multifunctional acrylate monomer and an acrylate oligomer having the elongation of 5 to 200%.

The preparation method of a polarizing plate of the present invention includes the steps of: coating a resin composition including a binder including a multifunctional acrylate monomer and an acrylate oligomer having the elongation of 5 to 200%, and a photoinitiator on a release film; forming a protective film by photocuring the coated resin composition; and laminating the protective film on one face of a polarizer to attach the same.

The present invention can be variously modified and have various forms, and specific examples of the present invention are explained in this description. However, it is not intended to limit the present invention to the specific examples and it must be understood that the present invention includes every modifications, equivalents, or replacements included in the idea and technical scope of the present invention.

Hereinafter, the resin composition for a polarizer protective film, the polarizer protective film, the polarizing plate including the same, and the preparation method of a polarizing plate of the present invention are explained in more detail.

In this description, 'acrylate' represents not only acrylates but also all of methacrylates and derivatives of the acrylates or the methacrylates to which a substituent is introduced.

The polarizer protective film according to one aspect of the present invention includes, a cured resin formed from a multifunctional acrylate monomer and an acrylate oligomer having the elongation of 5 to 200%.

The polarizer protective film is used for protecting a polarizer from external environments.

Commonly, a substrate made of a polyester such as polyethyleneterephtalate (PET), a cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI) or triacetylcellulose (TAC) may be used to the polarizer protective films.

Among the substrates, particularly, triacetylcellulose (TAC) film is widely used because of its excellent optical properties. However, since the TAC film is inferior in surface hardness and vulnerable to moisture when it is used solely, it is needed to add a functional coating layer such as a hard coating layer thereto. However, when the functional coating layer is added thereto, the total thickness of the protective film increases and it fail to meet the recent requirement of reducing the thickness, and there is concern about curling or cracking due to the additional coating.

Therefore, the present invention provides a protective film having a low thickness which can replace common TAC films and has a sufficient hardness without including a separate coating layer and accords with a slimming trend. Furthermore, the protective film of the present invention shows excellent optical properties for a polarizer protective film, and can exhibit excellent flexibility so as to make production, processing, storage, transport, and so on easy.

Furthermore, since the polarizer protective film of the present invention does not include a stretched film, it shows low retardation value as near as 0 substantially and thus it can be used not only to polarizer protective films but also to various devices requiring such low retardation value without limit.

In addition, it has an advantage of being applicable to large-scaled or curved displays because of its excellent processability and flexibility.

The polarizer protective film of the present invention includes a cured resin formed from a multifunctional acrylate monomer and an acrylate oligomer having the elongation of 5 to 200%.

The multifunctional acrylate monomer means a monomer having 2 or more acrylate functional groups of which the molecular weight is less than 1,000 g/mol. For Example, it may be hexanediol diacrylate (HDDA), tripropyleneglycol diacrylate (TPGDA), ethyleneglycol diacrylate (EGDA), trimethylolpropane triacrylate (TMPTA), trimethylolpropaneethoxy triacrylate (TMPEOTA), glycerin propoxylated triacrylate (GPTA), pentaerythritol tetraacrylate (PETA), or dipentaerythritol hexaacrylate (DPHA), and so on, but the protective film of the present invention is not limited to or by them. The multifunctional acrylate monomer is cross-linked with each other or with the acrylate oligomer disclosed below, and plays a role of giving a certain pencil hardness and wear resistance to the protective film.

The multifunctional acrylate monomers may be used solely or in combination with different monomers.

The acrylate oligomer is an acrylate having the elongation of about 5 to about 200%, or about 5 to about 100%, or about 10 to about 50% when it is measured according to ASTM D638, and, particularly, it means an oligomer having 2 or more acrylate functional groups. When the acrylate oligomer has the elongation of the above mentioned range, it can show excellent flexibility and elasticity without a decrease in mechanical properties. The present invention is accomplished on the basis of the fact that the acrylate oligomer satisfying the above mentioned elongation range is superior in flexibility and elasticity and forms the cured resin with the acrylate monomer, and can provide sufficient flexibility and curling property to the protective film including the same.

According to one embodiment of the present invention, the weight average molecular weight of the acrylate oligomer may have the range of about 1,000 to about 10,000 g/mol, or about 1,000 to about 5,000 g/mol, or about 1,000 to about 3,000 g/mol.

According to one embodiment of the present invention, the acrylate oligomer may be an acrylate oligomer modified with one or more of ethylene oxide, propylene oxide, or caprolactone. When the modified acrylate oligomer is used, more flexibility can be given to the acrylate oligomer by the modification, and the curling property and the flexibility of the protective film can be increased.

The acrylate oligomers may be used solely or in combination with different oligomers.

The protective film of the present invention includes a cured resin obtained by curing the multifunctional acrylate monomer and the acrylate oligomer having the elongation of 5 to 200% with UV-rays. Furthermore, the protective film of the present invention does not include a triacetylcellulose (TAC) component.

According to one embodiment of the present invention, the cured resin may be prepared by curing the multifunctional acrylate monomer and the acrylate oligomer having the elongation of 5 to 200% with the weight ratio of about 2:8 to about 8:2, or about 3:7 to about 7:3, or about 4:6 to about 6:4. When the cured resin is cured with the above mentioned weight range, the protective film of the present invention can have sufficient flexibility without a decrease in mechanical properties.

Since the protective film of the present invention includes the cured resin obtained by curing the multifunctional acrylate monomer and the acrylate oligomer having the elongation of 5 to 200%, it can show high hardness and can be made into a thinner form without a decrease in optical properties. Furthermore, it is superior in surface hardness and scratch resistance without a separate functional coating layer such as a hard coating layer. In addition, since it can secure more excellent flexibility, impact resistance and flexibility, it can be applied to large-scaled or curved displays. Furthermore, since it includes the cured resin layer instead of a stretched film, it shows low retardation value as near as 0 substantially and thus it can be used not only to polarizer protective films but also to various devices requiring such low retardation value without limit.

The protective film according to the present invention includes a cured resin in which the acrylate oligomer is crosslinked with the multifunctional acrylate monomer, and thus it can have flexibility with high hardness. Accordingly, it functions as not only a polarizer protective layer but also a hard coating layer without a separate functional coating layer, and can be applied to a multifunctional polarizer protective film.

According to one embodiment of the present invention, the protective film of the present invention may further include inorganic particles. The inorganic particles may be included in the cured resin in a dispersed form.

Inorganic particles of nanoscale, for example, nanoparticles of which the particle diameter is about 100 nm or less, or about 10 to about 100 nm, or about 10 to about 50 nm, may be used as the inorganic particles. Furthermore, for example, the inorganic particles may include silica particles, aluminum oxide particles, titanium oxide particles, zinc oxide particles, and the like.

By including the inorganic particles, it becomes possible to improve the hardness of the protective film more.

According to one embodiment of the present invention, in the case of that the protective film includes the inorganic particles, when the total weight of the cured resin is 100 parts by weight, about 1 to about 100 parts by weight, or about 10 to about 50 parts by weight, of the inorganic particles may be included therein. When the inorganic particles are included with the above mentioned weight range, it is possible to provide the protective film superior in both of hardness and flexibility.

According to one embodiment of the present invention, the protective film may have the thickness of about 10 μm or more, for example, about 10 to about 200 μm, or about 10 to about 100 μm, or about 10 to about 50 μm, or about 10 to about 40 μm, or about 10 to about 30 on. According to the present invention, when the film has the above mentioned thickness, it can be thinner than other films including a separate coating layer, and it is possible to provide the protective film of high hardness without the generation of curling or cracking.

The polarizer protective film of the present invention may be formed by photocuring the resin composition including the multifunctional acrylate monomer, the acrylate oligomer having the elongation of 5 to 200%, the photoinitiator, and selectively inorganic particles and an organic solvent.

According to another embodiment of the present invention, a resin composition including a binder including a multifunctional acrylate monomer and an acrylate oligomer having the elongation of 5 to 200%; and a photoinitiator is provided.

Details of the multifunctional acrylate monomer and the acrylate oligomer having the elongation of 5 to 200% are the same as disclosed above with regard to the protective film.

According to one embodiment of the present invention, when the total weight of the binder including the multifunctional acrylate monomer and the acrylate oligomer having the elongation of 5 to 200% is 100 parts by weight, about 20 to about 80 parts by weight, or about 30 to about 70 parts by weight, or about 40 to about 60 parts by weight, of the multifunctional acrylate monomer may be included therein. When the multifunctional acrylate monomer is included with the range, it is possible to form the protective film superior in both of hardness and flexibility. When the content of the multifunctional acrylate monomer is lower than 20 parts by weight, the crosslinking density gets lower and the mechanical properties of the surface layer such as pencil hardness or scratch resistance may decrease, and when the content is larger than 80 parts by weight, it is impossible to have sufficient flexibility because the surface layer is easy to break.

According to one embodiment of the present invention, when the total weight of the binder is 100 parts by weight, about 20 to about 80 parts by weight, or about 30 to about 70 parts by weight, or about 40 to about 60 parts by weight, of the acrylate oligomer may be included therein. When the content of the acrylate oligomer is lower than 20 parts by weight, the surface layer may not have sufficient flexibility, and when the content is larger than 80 parts by weight, the mechanical properties may be insufficient.

According to one embodiment of the present invention, the weight ratio of the multifunctional acrylate monomer and the acrylate oligomer having the elongation of 5 to 200% may be about 2:8 to about 8:2, or about 3:7 to about 7:3, or about 4:6 to about 6:4. When the cured resin is cured with the above mentioned weight range, the protective film of the present invention can have sufficient flexibility without a decrease in mechanical properties.

According to the resin composition of the present invention, the binder component includes the multifunctional acrylate monomer and the acrylate oligomer having the elongation of 5 to 200%, and the cured resin formed by polymerizing the multifunctional acrylate monomer and the acrylate oligomer can form a thinner protective film without a decrease in optical properties. The protective film formed like this is superior in surface hardness and scratch resistance without a separate functional coating layer such as a hard coating layer. In addition, excellent pliability and flexibility can be secured. Furthermore, since it includes the cured resin layer instead of a stretched film, the retardation value of the same is low as near as 0 substantially and thus it can be used not only to polarizer protective films but also to various devices requiring such low retardation value without limit.

The photoinitiator may be 1-hydroxy-cyclohexyl-phenyl ketone, 2-hydroxy-2-methyl-1-phenyl-1-propanone, 2-hydroxy-1-[4-(2-hydroxyethoxy) phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphineoxide, bis(2,4,6-trimethylbenzoyl)-phenylphosphineoxide, and so on, but it is not limited to or by them. Furthermore, as the products sold today, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and so on may be used. These photoinitiators may be solely or by mix of different 2 or more initiators.

According to one embodiment of the present invention, when the total weight of the binder is 100 parts by weight, the photoinitiator may be about 1 to about 10 parts by weight, or about 1 to about 8 parts by weight.

The resin composition of the present invention may be solvent free, if the components are uniformly mixed with a proper viscosity and there is no problem in a coating process.

Meanwhile, the resin composition of the present invention may further include an organic solvent for the uniform mix of the components and the coatability.

As the organic solvent, an alcohol solvent such as methanol, ethanol, isopropyl alcohol, and butanol; an alkoxy alcohol solvent such as 2-methoxyethanol, 2-ethoxyethanol, and 1-methoxy-2-propanol; a ketone solvent such as acetone, methyl ethyl ketone, methyl isobutyl ketone, methyl propyl ketone, and cyclohexanone; an ether solvent such as propylene glycol monopropyl ether, propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether, and diethylene glycol-2-ethylhexyl ether; and an aromatic solvent such as benzene, toluene, and xylene may be used solely or in combination.

According to one embodiment of the present invention, the content of the organic solvent is not limited particularly because it can be variously regulated as long as the properties of the resin composition do not decrease.

According to one embodiment of the present invention, the resin composition of the present invention may further include inorganic particles. The inorganic particles may be added to the cured resin in a form of being dispersed in the multifunctional acrylate monomer.

Inorganic particles of nanoscale, for example, nanoparticles of which the particle diameter is about 100 nm or less, or about 10 to about 100 nm, or about 10 to about 50 nm, may be used as the inorganic particles. Furthermore, for example, the inorganic particles may include silica particles, aluminum oxide particles, titanium oxide particles, zinc oxide particles, and the like.

By including the inorganic particles, it becomes possible to improve the hardness of the protective film more.

According to one embodiment of the present invention, in the case of that the resin composition includes the inorganic particles, when the total weight of the binder is 100 parts by weight, about 1 to about 100 parts by weight, or about 10 to about 50 parts by weight, of the inorganic particles may be included therein. When the inorganic particles are included with the above mentioned weight range, it is possible to provide the protective film superior in both of hardness and flexibility.

Furthermore, the resin composition may further include additives such as an UV absorber, a surfactant, an anti-yellowing agent, a leveling agent, and an antifoulant which are commonly used in the technical field to which the present invention pertains, in addition to the multifunctional acrylate monomer, the acrylate oligomer having the elongation of 5 to 200%, the inorganic particles, the photoinitiator, and the organic solvent. And, the content is not limited particularly because it can be variously regulated as long as the properties of the protective film of the present invention do not decrease.

According to one embodiment of the present invention, for example, the resin composition may include a surfactant as the additive, and the surfactant may be mono- or bifunctional fluorinated acrylate, fluorinated surfactant, or silicone surfactant. At this time, the surfactant may be included in a form of being dispersed or crosslinked in the cured resin.

Furthermore, an anti-yellowing agent may be included therein as the additive, and the anti-yellowing agent may be a benzophenone-based compound or a benzotriazole-based compound.

As disclosed above, the polarizer protective film may be prepared by photocuring the resin composition including the binder including the multifunctional acrylate monomer and the acrylate oligomer having the elongation of 5 to 200%, the photoinitiator, and selectively the organic solvent, the inorganic particles, and other additives.

According to another aspect of the present invention, a polarizing plate including a polarizer; and a protective film formed on at least one face of the polarizer, wherein the protective film includes a cured resin formed from a multifunctional acrylate monomer and an acrylate oligomer having the elongation of 5 to 200% is provided.

According to still another aspect of the present invention, a preparation method of a polarizing plate including the steps of: coating a resin composition including a binder including a multifunctional acrylate monomer and an acrylate oligomer having the elongation of 5 to 200%, and a photoinitiator on a release film; forming a protective film by photocuring the coated resin composition; and laminating the protective film on one face of a polarizer to attach the same is provided.

At first, the resin composition including the multifunctional acrylate monomer, the acrylate oligomer having the elongation of 5 to 200%, and the photoinitiator is coated on the release film. Details of the components included in the resin composition are the same as explained above with regard to the polarizer protective film. The resin composition may further include an organic solvent, inorganic particles and an additive, selectively.

Any release film which is commonly used in the technical field to which the present invention pertains can be used without limit. According to one embodiment of the present invention, the release film may be a polyester film such as a polyethyleneterephthalate film, a polyolefin film such as a polyethylene film and a polypropylene film, or Teflon film, and, preferably, it may be a film surface-treated with a silicone resin, a melamine resin, or a urea resin to be peeled easily. The thickness of the release film is not limited particularly but the release film having the thickness of about 20 to 200 μm may be mostly used.

The release film may be peeled off and eliminated after the resin composition is cured and before the protective film is attached to the polarizer. Or, it can be eliminated after the protective film is attached to the polarizer to the advantage of transport and storage.

The method of coating the resin composition is not limited particularly if it can be used in the related art. For example, bar-coating method, knife-coating method, roll-coating method, blade-coating method, die-coating method, microgravure-coating method, comma-coating method, slot die-coating method, lip-coating method, or solution casting method may be used.

Subsequently, the photocuring reaction is carried out by exposing the coated resin composition to UV rays so as to form the protective film. Before the UV radiation, the processes for leveling the coated surface of the resin composition and drying the same for evaporating the solvent included in the composition may be further carried out.

The dosage of UV rays, for example, may be about 20 to about 600 mJ/cm$^2$. The source of the UV radiation is not limited particularly if it can be used in the related art. For example, a high pressure mercury lamp, a metal halide lamp, a black light fluorescent lamp, and so on may be used.

After the resin composition is completely cured, the polarizer protective film that is formed into a single layer without a substrate film such as TAC or a separate coating layer can be obtained.

According to the polarizer protective film of the present invention, it is possible to prepare the protective film having high hardness without the generation of curling or cracking, because it is not directly formed on the polarizer but coated on a separate release film and cured and thus it has no substrate shrinking effect. Furthermore, it is possible to provide the polarizer protective film of high hardness showing a low retardation value without a decrease in optical properties such as light transmittance, haze, and the like which are required to the polarizer protective film.

Since the protective film of the present invention shows high hardness, flexibility, scratch resistance, high transparency, and so on, it can be used as a single layer film for protecting the polarizer and can be usefully used to various display devices.

In the present invention, the protective film may be formed on only one face or both faces of the polarizer.

A polarizer exhibits a property making it able to extract only light that vibrates in one direction from light incident while vibrating in different directions. This property may be achieved by stretching polyvinyl alcohol (PVA) having iodine absorbed thereto under strong tension. For example, more specifically, a polarizer may be formed by swelling a PVA film in an aqueous solution, dyeing the swollen PVA film with a dichroic material to impart polarization performance to the film, stretching the dyed PVA film to arrange the dichroic material parallel to a stretch direction, and correcting the color of the stretched PVA film. However, the polarizing plate of the present invention is not limited thereto.

The polarizing plate of the present invention includes the protective film formed on at least one face of the polarizer.

The protective film may have the thickness of about 10 μm or more, for example, about 10 to about 100 μm, or about 10 to about 50 μm, or about 10 to about 40 μm, or about 10 to about 30 on.

Furthermore, the total thickness of the polarizing plate of the present invention may be about 45 μm or more, for example, about 45 to about 250 μm, or about 50 to about 120 μm, or about 50 to about 100 on. According to the present invention, it is possible to achieve the high hardness without the generation of curling or cracking while having a thinner thickness like above.

The protective film includes the cured resin formed from the multifunctional acrylate monomer and the acrylate oligomer having the elongation of 5 to 200%, and, selectively, may include inorganic particles dispersed in the cured resin in addition. Details of the same and the preparation method of the protective film are the same as explained above with regard to the polarizer protective film.

According to one embodiment of the present invention, the polarizing plate of the present invention may further include an adhesive layer between the polarizer and the protective film.

The adhesive layer may include an adhesive for polarizer which has transparency and can maintain the polarization property of the polarizer. The adhesive useful therefor is not particularly limited so long as it is known in the art. Examples of the adhesive may include a one-part or two-part polyvinylalcohol (PVA) adhesive, an acryl adhesive, a polyurethane adhesive, an epoxy adhesive, a styrene butadiene rubber (SBR) adhesive, a hot melt adhesive, etc., but the present invention is not limited thereto.

The thickness of the adhesive layer may be about 0.1 to about 10 μm, or about 0.1 to about 5 μm, but it is not limited to this.

Subsequently, the polarizing plate of the present invention may be obtained by laminating and attaching the protective film prepared on the polarizer by using the adhesive. At this time, the release film may be selectively peeled off and eliminated after the resin composition is cured, and before or after the protective film is attached to the polarizer.

According to one embodiment of the present invention, the protective film may be laminated on both faces of the polarizer.

According to another embodiment of the present invention, it is possible that the protective film is laminated on just one face of the polarizer and any other general film such as TAC is laminated on the other face of the same. At this time, the protective film may be located at the outermost layer facing to the user. Like this, the protective film of the present invention shows high hardness, scratch resistance, and optical properties suitable to the outermost layer.

The protective film of the present invention shows excellent properties enough to replace TAC films. Therefore, the polarizing plate including the same can have excellent pencil hardness, curling property, flexibility, and optical properties.

For example, according to one embodiment of the present invention, when the polarizing plate of the present invention is exposed to room temperature for 24 hrs and located on a flat plane, the average distance between each edge or side of the polarizing plate and the flat plane may be about 3 mm or less, or about 2 mm or less, or about 1 mm or less.

Furthermore, the polarizing plate of the present invention may show the pencil hardness of 1H or more, or 2H or more, or 3H or more, at the load of 500 g.

Also, the polarizing plate of the present invention may show the light transmittance of 40% or more, or 42% or more.

Furthermore, the polarizing plate of the present invention may show no cracking when it is wound on a cylindrical mandrel having a diameter of 15 mm, or 12 mm, or 5 mm.

Furthermore, the protected film included in the polarizing plate of the present invention may show the retardation value of 0 to 1 nm, or 0 to 0.6 nm, or 0 to 0.5 nm in an in-plane direction thereof.

The polarizing plate including the protective film of the present invention may be utilized in various fields. For example, it may be used to mobile communication handsets, smart phones, other mobile devices, display devices, electronic blackboards, outdoor billboards, and various display parts. According to the present invention, the polarizing plate may be a polarizing plate for TN (Twisted Nematic) or STN (Super Twisted Nematic) liquid crystals, a polarizing plate for horizontal alignment modes such as IPS (In-Plane Switching), Super-IPS, FFS (Fringe Field Switching), etc., or a polarizing plate for vertical alignment modes.

A better understanding of the present invention may be obtained through the following examples which are set forth to illustrate, but are not to be construed as limiting the present invention.

EXAMPLES

Preparation of Protective Films

Example 1

A coating solution was prepared by mixing 50 g of trimethylolpropane triacrylate (TMPTA), 20 g of DPCA120

(Nippon Kayaku, a caprolactone-modified 6-functional acrylate, elongation measured by ASTM D638: 12%, Mw: 1,950), 30 g of PU3400 (Miwon, an ethylene oxide-modified 3-functional acrylate, elongation measured by ASTM D638: 20%, Mw 2,500), 6 g of a photoinitiator (brand name: Darocur TPO), 3 g or a UV absorber (brand name: Chimassorb 81), and 10 g of MEK, and bar-coated on a PET release film. After drying the same at 60° C. for 2 mins, the protective film having the thickness of 25 μm was prepared by exposing the same to black UV rays in a nitrogen atmosphere.

Example 2

A coating solution was prepared by mixing 50 g of trimethylolpropane triacrylate (TMPTA), 20 g of DPCA120, 30 g of TA604AU (NOF Co., an ethylene oxide-modified 3-functional acrylate, elongation measured by ASTM D638: 49%, Mw: 2,300), 6 g of a photoinitiator (brand name: Darocur TPO), 3 g or a UV absorber (brand name: Chimassorb 81), and 10 g of MEK, and bar-coated on a PET release film. After drying the same at 60° C. for 2 mins, the protective film having the thickness of 25 μm was prepared by exposing the same to black UV rays in a nitrogen atmosphere.

Example 3

A coating solution was prepared by mixing 50 g of C150 (a product that 50% of $SiO_2$ of 20 nm is dispersed in TMPTA of Nano resin, 25 g, $SiO_2$ 25 g), 20 g of PU3400, 30 g of TA604AU, 6 g of a photoinitiator (brand name: Darocur TPO), 3 g or a UV absorber (brand name: Chimassorb 81), and 10 g of MEK, and bar-coated on a PET release film. After drying the same at 60° C. for 2 mins, the protective film having the thickness of 25 μm was prepared by exposing the same to black UV rays in a nitrogen atmosphere.

Comparative Example 1

A coating solution was prepared by mixing 50 g of trimethylolpropane triacrylate (TMPTA), 50 g of EB1290 (SK Cytec, 6-functional urethane acrylate, elongation measured by ASTM D638: 0%, Mw: 1,000), 6 g of a photoinitiator (brand name: Darocur TPO), 3 g or a UV absorber (brand name: Chimassorb 81), and 10 g of MEK, and bar-coated on a PET release film. After drying the same at 60° C. for 2 mins, the protective film having the thickness of 6 μm was prepared on a TAC film by exposing the same to black UV rays in a nitrogen atmosphere.

Preparation of Polarizing Plates

Example 4

After laminating and attaching the protective film prepared in Example 1 on a PVA film by using an acryl adhesive so that the thickness of the adhesive layer was about 1 μm, the PET release film was peeled off.

The polarizing plate was prepared by laminating a TAC film having the thickness of 40 μm on the other face of the PVA film according to the same method above.

Example 5

The polarizing plate was prepared according to the same method as in Example 4, except that the protective film of Example 2 was laminated on one face of the PVA film and a TAC film having the thickness of 40 μm was laminated on the other face thereof.

Example 6

The polarizing plate was prepared according to the same method as in Example 4, except that the protective film of Example 3 was laminated on one face of the PVA film and a TAC film having the thickness of 40 μm was laminated on the other face thereof.

Comparative Example 2

The polarizing plate was prepared according to the same method as in Example 4, except that the TAC film of Comparative Example 1 on which the coating layer was formed was laminated on one face of the PVA film and a TAC film having the thickness of 40 μm was laminated on the other face thereof.

Comparative Example 3

The polarizing plate was prepared by laminating and attaching TAC films having the thickness of 40 μm on both faces of a PVA film by using an acryl adhesive so that the thickness of the adhesive layer was about 1 μm.

Experimental Examples

<Measuring Methods>
1) Thickness
Thickness was measured by using a digital micrometer.
2) Transmittance
Transmittance and haze were measured by using a haze meter (HM 150).
3) Retardation Value
Retardation value in an in-plane direction was measured by using a retardation measuring device (Axoscan).
4) Pencil Hardness
The hardness was evaluated according to the Japanese Standard JIS K5400. In this regard, the surface of the polarizing plate was rubbed 5 times back and forth with a pencil hardness meter under the load of 500 g to determine the hardness at which no scratches appeared.
5) Scratch Resistance
The load which did not scratch on the surface of the polarizing plate after the polarizing plate was rubbed 10 times back and forth with a steel wool (#0000) under a certain load was checked.
6) Curling Property
After cutting the polarizing plate into the dimension of 10 cm×10 cm and storing the same at room temperature for 24 hrs and placing the piece of the polarizing plate on a flat plane, the average distance between each edge of the piece and the flat plane was measured.
7) Cylindrical Bending Test
Each polarizing plate was wound on a cylindrical mandrel having a diameter of 5 mm and whether it was cracked or not was checked. When the polarizing plate was not cracked, it was evaluated as OK. If the polarizing plate was cracked, it was evaluated as X.

The results of the measurements are listed in the following Table 1.

TABLE 1

|  | Example 4 | Example 5 | Example 6 | Comparative Example 2 | Comparative Example 3 |
|---|---|---|---|---|---|
| Thickness of polarizing plate | 91 μm | 90 μm | 91 μm | 111 μm | 105 μm |
| Transmittance | 43.0% | 43.0% | 42.7% | 42.6% | 42.7% |
| Haze | 0.2 | 0.3 | 0.2 | 0.3 | 0.2 |
| Retardation | 0.2 nm | 0.3 nm | 0.3 nm | 2.2 nm | 2.2 nm |
| Pencil hardness | 3H | 2H | 3H | 3H | HB |
| Scratch resistance | 500 g | 500 g | 500 g | 500 g | 50 g |
| Curing property | 0.7 mm | 0.3 mm | 0.3 mm | 28.5 mm | 0.1 mm |
| Bending test | OK | OK | OK | X | OK |

As show in Table 1, the polarizing plates of Examples of the present invention show satisfactory results in all of the properties. Particularly, they show not only high hardness and excellent curling property but also flexibility and low retardation value with thinner thickness in comparison to Comparative Example 2 using the prior protective film including the TAC film and the coating layer and Comparative Example 3 using the protective film including only the TAC film, and can be usefully used to the display devices needing to be thin.

What is claimed is:

1. A resin composition, including:
a binder including 20 to 80 parts by weight of a multi-functional acrylate monomer, 20 to 80 parts by weight of an acrylate oligomer having an elongation of 10 to 50%, and 1 to 10 parts by weight of a photoinitiator, wherein the total weight of the binder is 100 parts by weight; and
wherein the acrylate oligomer has 3 to 6 functional groups and is modified with one or more selected from the group consisting of ethylene oxide and propylene oxide.

2. The resin composition according to claim 1, further including inorganic particles.

3. The resin composition according to claim 2, including 1 to 100 parts by weight of the inorganic particles when the total weight of the binder is 100 parts by weight.

4. A polarizer protective film, including a cured resin formed from the resin composition of claim 1.

5. The polarizer protective film according to claim 4, further including inorganic particles which are dispersed in the cured resin.

6. The polarizer protective film according to claim 5, including 1 to 100 parts by weight of the inorganic particles when the total weight of the cured resin is 100 parts by weight.

* * * * *